United States Patent [19]

Kurihara et al.

[11] Patent Number: 5,148,901
[45] Date of Patent: Sep. 22, 1992

[54] HUB CLUTCH FOR AUTOMOTIVE VEHICLE

[75] Inventors: Sakuo Kurihara; Kazuhiro Sakamoto, both of Tochigi, Japan

[73] Assignee: Tochigifujisangyo Kabushiki Kaisha, Ohmiya, Japan

[21] Appl. No.: 676,259

[22] Filed: Mar. 27, 1991

[51] Int. Cl.⁵ .................. F16D 11/00; F16D 25/061
[52] U.S. Cl. .................. 192/67 R; 60/475; 192/30 W; 192/85 A
[58] Field of Search .............. 192/49, 50, 85 A, 85 V, 192/30 W, 67 R; 60/475

[56] References Cited

U.S. PATENT DOCUMENTS

| | | | |
|---|---|---|---|
| 2,457,467 | 12/1948 | Hartman | 60/475 |
| 2,467,508 | 4/1949 | Trautman | 60/475 X |
| 4,293,061 | 10/1981 | Brown | 192/67 R |
| 4,625,846 | 12/1986 | Gomez | 192/67 R |
| 4,667,767 | 5/1987 | Shea et al. | 192/44 X |
| 4,960,192 | 10/1990 | Kurihara | 192/67 R |

Primary Examiner—Rodney H. Bonck
Attorney, Agent, or Firm—Graham & James

[57] ABSTRACT

A hub clutch for locking or unlocking a wheel drive shaft to or form a hub clutch housing, comprises: a drive gear fixed to the wheel drive shaft; a slide gear slidably engaged or disengaged with or from the drive gear to lock or unlock the wheel drive shaft to or form the hub clutch housing; an elastic member for urging the slide gear into engagement or disengagement with or from the slide gear; a pressure source for supplying pressure into a pressure chamber formed between the wheel drive shaft and the hub clutch housing to shift the slide gear against an elastic force of the elastic member; and in particular a pressure supplementing switch for supplementing pressure supplied from the pressure source into the pressure chamber, whenever pressure within the pressure chamber drops below a predetermined value. Since the slide gear shifting pressure can be always maintained at a constant value irrespective of pressure leakage through the sealing members, the hub clutch reliability can be improved and the lifetime of the sealing members can be increased.

2 Claims, 3 Drawing Sheets

HUB CLUTCH FOR AUTOMOTIVE VEHICLE

BACKGROUND OF THE INVENTION

Field of the Invention

The present invention relates to a hub clutch for an automotive vehicle suitable for use in a part-time 4WD (four wheel drive) vehicle which can be driven in both 4WD travel mode and 2WD (two wheel drive) travel mode.

Description of the Prior Art

In a 2-4WD selectable vehicle (referred to as part-time 4WD vehicle), when the vehicle is driven in the 2WD travel mode, since two front or rear wheels are disconnected from an engine, a driving mechanism including a propeller shaft, a differential shaft, etc. on the disconnected side is driven by the rotating wheels, so that there exist various problems in that noise and vibration are generated; the fuel consumption rate increases; the lifetime of the driving mechanism decreases, etc.. To overcome these problems, a hub clutch is used to disconnect the non-driven vehicle wheels from the non-driven driving mechanism. An example of these hub clutch (an apparatus for controlling the disconnection operation between the wheels and the driving mechanism) is disclosed in U.S. Pat. No. 4,627,512 entitled AIR ACTUATED CLUTCH FOR FOUR WHEEL DRIVE VEHICLES, as shown in FIG. 1. In the drawing, this apparatus is composed of a hub lock member 203 rotatable together with a vehicle wheel 201; a driving tooth ring member 207 rotatable together with a wheel drive shaft 205; a clutch ring 209 for connecting (locking) or disconnecting (releasing) these two members 203 and 207, when shifted; an air tight chamber 213 for shifting the clutch ring 209 against an elastic force of a spring 208 by pressure supplied from the pressure source 211; a vehicle body side spindle 215 through which a wheel drive shaft 205 is passed for spline engagement; and some sealing members 217, 219, etc. disposed between the hub lock member 203 and the wheel drive shaft 205 to keep the airtight chamber 213 under airtight condition; etc.. In 4WD travel mode, the hub lock member 203 is locked to the driving tooth ring member 207 via the clutch ring 209 to drive the vehicle wheel 201 via the hub lock member 203; and in 2WD travel mode, the hub lock member 203 is released from the driving tooth ring member 207 via the clutch ring 209 to disconnect the wheel drive shaft 205 from the vehicle wheel 201.

In the prior-art apparatus, it is required to increase the contact pressure of these sealing members 217 and 219 disposed between the rotary members 203 and 205 and the fixed member against the sliding surfaces in order to maintain a high sealing capability. However, when the contact pressure is increased, there exists a problem in that the rotative resistance of the rotary members 203 and 205 increases. In addition, when the contact pressure of the sealing members is increased, since the sliding surfaces thereof tend to be easily worn away and therefore the sealing lifetime is reduced, there arises another problem in that pressurized air easily leaks through these sealing members 217 and 219 in the pneumatic system composed of the pressure source 211, a pressurized air supply passage 221, the airtight chamber 213, etc.. In case of leakage in the pneumatic system, the apparatus becomes inoperative. That is, where the locking function is disabled, the vehicle cannot be driven in the 4WD travel mode; and where the unlocking function is disabled, the vehicle cannot be driven in the 2WD travel mode.

SUMMARY OF THE INVENTION

With these problems in mind, therefore, it is the primary object of the present invention to provide a hub clutch which can maintain a normal lock/unlocking function even if pressurized air leaks through the sealing members.

To achieve the above-mentioned object, the hub clutch for locking and unlocking a wheel drive shaft (1) to and from a hub clutch housing (15) according to the present invention, comprises: (a) a drive gear (7) fixed to the wheel drive shaft; (b) a slide gear (59) slidably engaged with said drive gear to lock the wheel drive shaft to the hub clutch housing and slidably disengaged from said drive gear to unlock the wheel drive shaft from the hub clutch housing; (c) an elastic member (89) for urging said slide gear into locking or unlocking to or form said slide gear; (d) a pressure source (109, 107) for supplying pressure into a pressure chamber (95) formed between the wheel drive shaft and the hub clutch housing to move said slide gear against an elastic force of said elastic member; and (e) pressure supplementing means (117) associated with said pressure source, for supplementing pressure supplied from said pressure source into the pressure chamber, whenever pressure within the pressure chamber drops below a predetermined value.

The pressure supplementing means comprises: (a) a pressure sensor (117, 117A) for sensing a drop in pressure within the pressure chamber; and (b) a pressure switch (117) for activating said pressure source when said pressure sensor detects a drop in pressure within the pressure chamber below a predetermined value.

Where the pressure source comprises: (a) a motor (109); and (b) a pump (107) driven by said motor to supply a pressurized air into the pressure chamber, the pressure supplementing means is a pressure switch (117) connected in series to said motor, said pressure switch being turned off when pressure within the pressure chamber rises beyond a first predetermined value and turned on when drops below a second predetermined value.

In the hub clutch according to the present invention, when a pressure (positive or vacuum) is supplied from the pressure source to the pressure chamber formed between the wheel drive shaft and the hub clutch housing, the slide gear is shifted into engagement (4WD) or disengagement (2WD) position against an elastic force of a spring. When the pressure is released open to the atmospheric pressure, the slide gear is returned to the original position. Further, where pressure within the pressure chamber drops due to leakage through sealing members disposed in the pressure chamber, since drop in pressure within the pressure chamber can be detected and pressure is supplied again from the pressure source to the pressure chamber, the slide gear shifting pressure can be maintained at all times at a constant value, irrespective of pressure leakage, thus improving the hub clutch reliability and the sealing member lifetime.

DETAILED DESCRIPTION OF THE PREFERRED EMBODIMENTS

Figure 1:
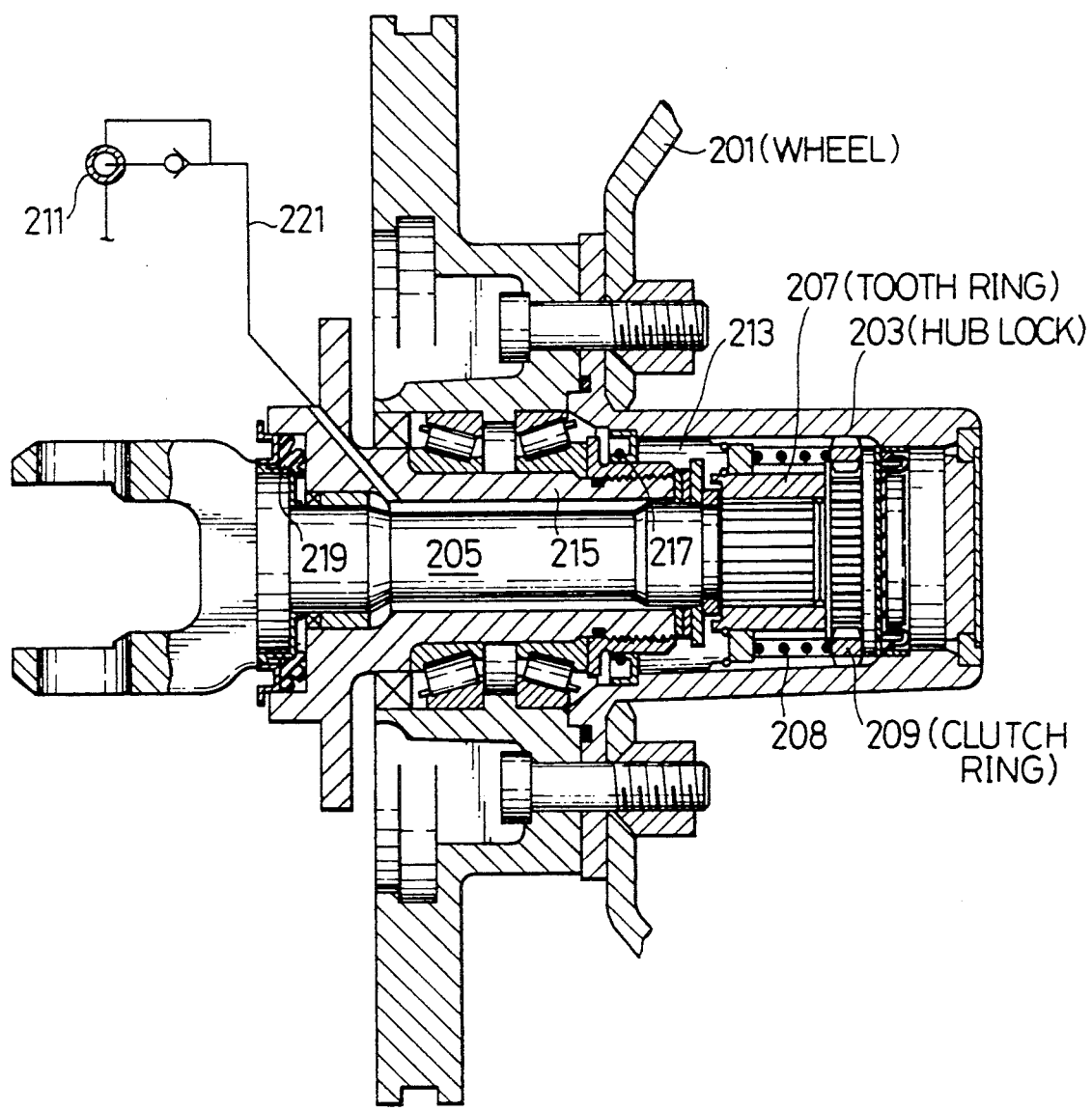
FIG. 1 is a cross-sectional view showing an example of prior-art hub clutch.
Figure 2:
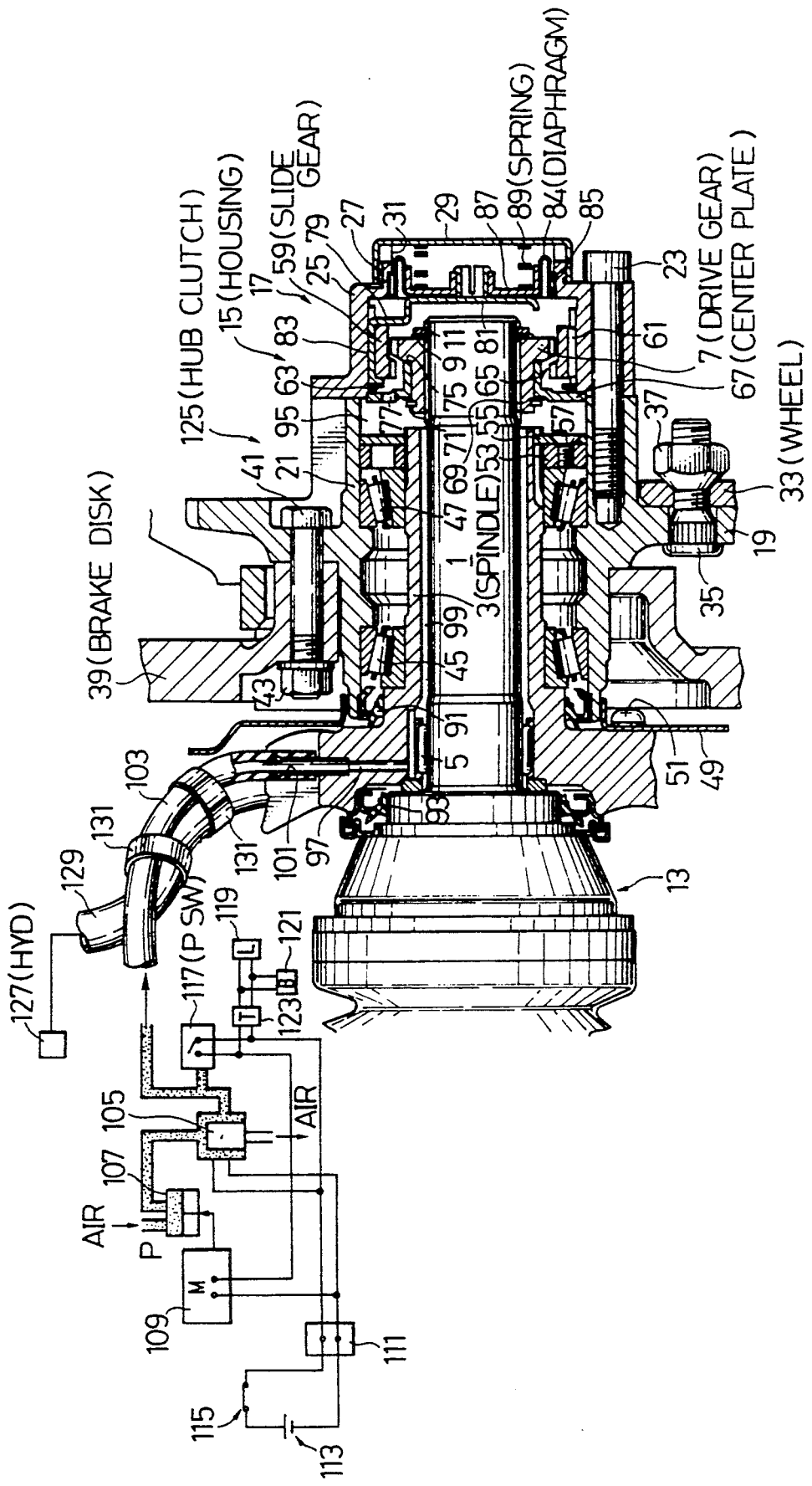
FIG. 2 is a cross-sectional view showing an embodiment of the hub clutch according to the present invention.

An embodiment of the hub clutch according to the present invention will be explained with reference to the attached drawings. FIG. 2 shows a hub clutch provided on the front wheel side of a part-time 4WD vehicle in order to lock and unlock the front wheels to and from the front wheel driving shaft. In FIG. 2, the horizontal direction corresponds to the vehicle transversal direction.

A wheel drive shaft 1 is rotatably supported via a bearing 5 by a spindle 3 fixed to a vehicle body. On the right side end of the wheel drive shaft 1, a drive gear 7 is fixedly spline coupled to the drive shaft 1 and retained by a retainer 9 and a snap ring 11. Further, a universal joint 13 is connected to the left side of the wheel drive shaft 1.

A housing 15 is formed with an end member 17 and a cylindrical based member 21 formed with a flange 19. These two members 17 and 21 are fixed to each other with bolts 23. The end member 17 is composed of a cylindrical portion 25 and a cover 29 attached to a threaded portion 27 formed in the cylindrical portion 25. Further, a filter 31 is disposed between the cylindrical portion 25 and the cover 25 in order to prevent dust and mud from entering inside from outside. A front right side wheel 33 is fixed to the flange 19 with bolts 35 and nuts 37, and a brake disk 39 is fixed to the cylindrical base member 21 with bolts 41 and nuts 43. Further, the housing 15 is disposed on the outer circumferential side of the spindle 3 and the drive gear 7 in coaxial positional relationship with respect to each other, and rotatably supported on the spindle 3 via two bearings 45 and 47.

Further, a protective cover 49 is fixed to the spindle 3 with bolts 51 to protect the fixed vehicle body side from the rotation of the brake disk 39. A lock nut 53 is screwed on the right side outer circumferential surface of the spindle 3 to retain the bearing 47, and further a turning prevention member 55 is fixed to the lock nut 53 with screws 57.

A ring-shaped slide gear 59 (locking member) is axially slidably supported within the housing 15 via splines 61 formed on the inner circumferential surface of the cylindrical portion 25 of the housing 15. Further, a retainer 63 is fixed to the cylindrical portion 25 to restrict the leftward motion of the slide gear 59.

Two slidably engageable splines 65 are formed on the outer circumference of the drive gear 7 and the inner circumference of the slide gear 59. Therefore., when the slide gear 59 is axially shifted in the rightward direction, the wheel 33 is locked to the wheel drive shaft 1, and when the slide gear 59 is axially shifted in the leftward direction, the wheel 33 is unlocked from the wheel drive shaft 1 as shown in FIG. 2. That is, at the lock position (4WD), the drive gear 7 is engaged with the slide gear 59, and at the unlock position (2WD), the drive gear 7 is disengaged from the slide gear 59.

A center plate 67 is disposed between the drive gear 7 and the cylindrical portion 25 in such a way that the outer circumference thereof is fixed to the housing 15 and the inner circumferential thereof is rotatably supported on the drive gear 7. Further, the center plate 67 is retained with a retainer 69 and a snap ring 71 on the left side of the drive gear 7. Since the center plate 67 is in contact with the drive gear 7 at the right side contact surface 75, this center plate 67 serves to align the driving gear 7 with the housing 15 so that the splines 65 can be smoothly engaged with or disengaged from each other, and further the leftward movement of the drive gear 7 and the wheel drive shaft 1 can be restricted at this contact surface 75. Further, the center plate 67 is formed with an aperture 77 through which pressurized air can be passed.

A plate 81 formed with a plurality of arms 79 is disposed between the wheel drive shaft 1 and the cover 29 of the housing 15 so as to be axially slidable within the housing 15. Each arm 79 is passed through each cutout portion 83 formed in the spline portion 61 and fixed to the outer circumference of the slide gear 59. Therefore, the slide gear 59 and the plate 81 can be moved together in the horizontal direction in FIG. 2.

On the right side of the housing 15, a diaphragm (flexible partition) 84 is disposed so as to be urged leftward by a return spring 89. The inner portion of the diaphragm 84 is fixedly sandwiched between the plate 81 and a plate 87 to which the return spring 89 is attached. The outer portion of the diaphragm 84 is fixed to a ring 85 airtightly fixed to the inner circumference of the cylindrical portion 25 of the housing 15.

A sealing member 91 is disposed between the left end portion of the housing 15 and the spindle 3, and another sealing member 93 is disposed between the wheel drive shaft 1 and the left end portion of the spindle 3. Therefore, a pressure chamber 95 is formed on the left side of the diaphragm 84 fixed to the housing 15. When a pressurized (positive) pressure is supplied into the pressure chamber 95, since the diaphragm 84 is shifted rightward against an elastic force of the spring 89, the slide gear 59 is shifted rightward via the plate 81 into engagement with the drive gear 7 to drive the vehicle in 4WD travel mode. On the other hand, when the pressure chamber 95 is released to the atmospheric pressure, since the diaphragm 85 is returned leftward by the elastic force of the spring 89, the slide gear 59 is shifted leftward via the plate 81 into disengagement from the drive gear 7 to drive the vehicle in 2WD travel mode.

The pressure supply system will be explained hereinbelow. The pressure supply system is composed of a battery 113, a switch 115 arranged in the vehicle room, a connector 111, a motor 109 for driving a pump 107, a valve 105 electrically connected in parallel to the motor 109, a pressure switch 117 electrically connected in series to the motor 109, a timer 123, an alarm lamp 119 and an alarm buzzer 121 both arranged in the vehicle room.

Therefore, when the driver turns on the switch 115, since the motor 109 is driven to actuate the pump 109 and further the valve 105 actuated closed, pressurized air is supplied from the pump 107 into the air hose 103 via the valve 105. The pressurized air supplied into the air hose 103 is then introduced into the pressure chamber 95 by way of a hose connecting pipe 101, an orifice 97 radially formed in the spindle 3, and an annular gap 99 formed between the wheel drive shaft 1 and the spindle 3 and communicating with the pressure chamber 95.

On the other hand, when the driver turns off the switch 115, since the motor 109 stops and further the valve 105 is deactuated open to the atmospheric pressure, the pressurized air is released to the atmospheric pressure.

Further, in case the pressure of the pressurized air rises beyond a predetermined value, since the pressure switch 117 connected in series with the motor 109 is turned off, the motor 17 stops actuating the pump 107. This pressure switch 117 for sensing the pressure of the pressure supply system is turned off at 0.30 kg/cm$^2$, for instance when the pressure increases and turned on at 0.25 kg/cm$^2$, for instance when the pressure decreases. Further, when the pressure switch 117 is turned on, since the timer 123 is activated for a predetermined time period, the alarm lamp 119 and the alarm buzzer 121 are both turned on to inform the driver of the 4WD travel mode. The switch 115 can be turned on or off manually by the driver or automatically according to vehicle wheel rotating conditions or road surface conditions.

Further, a brake hose 129 is connected between a hydraulic actuator 127 and a wheel cylinder (not shown) of a brake system (not shown) and bundled together with the air hose 103 by a hose band 131.

The operation of the hub clutch 125 constructed as described above will be explained hereinbelow. When 2WD travel mode is required, the driver turns off the switch 115. Since the valve 105 is released open to the atmospheric pressure and the pressure chamber 95 is also released to the atmospheric pressure, the slide gear 59 is kept disengaged from the drive gear 7 and therefore the hub clutch 125 is kept at unlock-condition as shown in FIG. 2. Under these conditions, the front wheel driving mechanism is disconnected from the front wheel and therefore is not driven by the front wheel. Therefore, vibration or noise is reduced; the fuel consumption rate is improved; and the lifetime of the driving mechanism can be improved. Under these conditions, although the pressure switch 117 is turned on, since the switch 115 is turned off, the timer 123 is not activated to generate an alarm. Further, whenever the travel mode is switched to the 2WD travel mode, since the valve 105 is released open and therefore the pressure supply system is released to the atmospheric pressure, even when the pressure supply system is cooled by water, for instance, the pressure of the pressure supply system will not be reduced to a vacuum, so that it is possible to securely prevent water or dust from entering the pressure chamber through the sealing members 91 and 93 or other positions of the pressure supply system.

When 4WD travel is required, the driver turns on the switch 115. Since the valve 105 is closed and simultaneously the motor 109 is driven to actuate the pump 107 because the pressure switch 117 is kept turned on, pressurized air is supplied from the pump 107 into the pressure chamber 95 via the air hose 103. Therefore, the slide gear 59 is brought into engagement with the drive gear 7, so that the hub clutch 125 is kept at lock condition. Under these conditions, since the vehicle is driven by four wheels, the vehicle can be driven on muddy road or the straight travelling stability can be improved.

When the motor 109 is driven and therefore the pressure within the pressure supply system rises up to 0.3 kg/cm$^2$, for instance, since the pressure switch 117 is turned off to stop the motor 109, so that the system pressure is maintained at this pressure value. However, in case the system pressure drops down to 0.25 kg/cm$^2$, for instance due to pressure leakage through the sealing members 91 and 93, since the pressure switch 117 is turned on again, the system pressure is increased again up to 0.30 kg/cm$^2$. Therefore, it is possible to maintain the system pressure at a constant valve at all times, irrespective of the pressure or absence of pressure leakage through the sealing members. In other words, in the prior-art hub clutch, since no pressure supplementing function is provided for the hub clutch, the system pressure has been so far set to a relatively high pressure value under consideration of leakage. In the present invention, however, since the system pressure can be set to a lower value there exist various advantages such that the switching time from 2WD to 4WD can be reduced because a lower pressure can be quickly established by the pump 107; the lifetime of the elements such as motor 109, pump 107, sealing members 91 and 93, etc. can be improved due to lower system pressure.

Further, whenever the pressure switch 117 is turned on for pressure supplement, since the timer 123 is activated for a predetermined time period to generate an alarm, it is possible to know the pressure leakage through the sealing member.

The hub clutch of the present invention can be modified in various ways. For instance, it is also possible to engage the slide gear 59 with the drive gear 7 to realize the 4WD travel mode (lock condition) when the slide gear 59 is shifted in the leftward direction and disengage the slide gear 59 from the drive gear 7 to realize the 2WD travel mode (unlock condition) when the slide gear 59 is shifted in the rightward direction.

Figure 3:
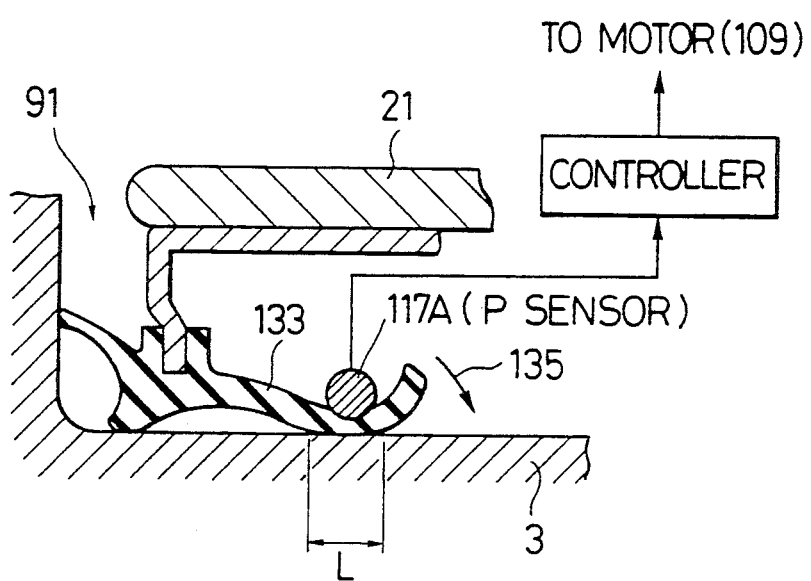
FIG. 3 is an enlarged cross-sectional view showing a sealing member according to the present invention, for assistance in explaining a modification of a pressure sensor.

Further, the pressure sensing switch (pressure sensor) is not limited to the pressure switch 117 disposed in the pressurized air supply passage as shown in FIG. 2. FIG. 3 shows another example of the pressure sensing switch 117A. In this embodiment, when the system pressure increases within the pressure chamber 95, since a lip portion 133 of the sealing member 91 is deformed toward the outer circumference of the spindle 3 in the arrow direction 135 in such a way that a contact distance L between the lip portion 133 and the spindle 3 increases, it is possible to detect the deformation in shape of the sealing member 91 by a pressure sensor 117A. When this pressure sensor 117A outputs a sensor signal, this sensor signal is applied to a controller 120 to drive the motor 109.

Further, the pressure medium is not limited to air, but other mediums (e.g. gas, liquid, etc.) can be replaced with air. Furthermore, a vacuum pressure can be supplied into the pressure chamber, instead of a positive pressure.

As described above, in the hub clutch according to the present invention, since the system pressure can be always maintained at a predetermined constant value, irrespective of leakage in the pressure supply system, it is possible to reliably switch the 4WD travel mode to the 2WD travel mode or vice versa.

What is claimed is:

1. A hub clutch for locking and unlocking a wheel drive shaft to and from a hub clutch housing, which comprises:
   (a) a drive gear fixed to the wheel drive shaft;
   (b) a slide gear slidably engaged with said drive gear to lock the wheel drive shaft to the hub clutch housing and slidably disengaged from said drive gear to unlock the wheel drive shaft from the hub clutch housing;

(c) an elastic member for urging said slide gear into engagement with or disengagement from said slide gear;
(d) a pressure source composed of an electric motor and a pump driven by said motor, for supplying pressure into a pressure chamber formed between the wheel drive shaft and the hub clutch housing to move said slide gear against an elastic force of said elastic member; and
(e) pressure supplying means comprising;
   (1) a valve mechanically connected to the pump for releasing the pressure to the atmosphere or supplying the pressure into the pressure chamber; and
   (2) a pressure switch mechanically connected to said valve and electrically connected in series with said motor, for activating said motor to supply pressure into the pressure chamber via said valve when pressure to be supplied into the pressure chamber drops below a predetermined value and deactivating said motor when the pressure rises beyond another predetermined value, to maintain the pressure at a constant level.

2. The hub clutch of claim 1, which further comprises a timer activated for a predetermined time period to generate an alarm, wherever said pressure switch is turned on by a drop in pressure to be supplied into the pressure chamber.

* * * * *